United States Patent
Cao et al.

(10) Patent No.: US 10,630,801 B2
(45) Date of Patent: Apr. 21, 2020

(54) DATA SHUNTING METHOD, DATA TRANSMISSION DEVICE, AND SHUNTING NODE DEVICE

(71) Applicant: Huawei Technologies Co., Ltd., Shenzhen (CN)

(72) Inventors: Zhenzhen Cao, Shenzhen (CN); Yi Jiang, Shenzhen (CN); Wei Quan, Shenzhen (CN); Yu Wang, Shenzhen (CN); Xiaolong Guo, Shenzhen (CN); Qufang Huang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 750 days.

(21) Appl. No.: 14/604,149

(22) Filed: Jan. 23, 2015

(65) Prior Publication Data
US 2015/0134769 A1 May 14, 2015

Related U.S. Application Data

(63) Continuation of application No. PCT/CN2012/079150, filed on Jul. 25, 2012.

(51) Int. Cl.
*H04W 28/02* (2009.01)
*H04W 40/02* (2009.01)
(Continued)

(52) U.S. Cl.
CPC ................ *H04L 67/2842* (2013.01)

(58) Field of Classification Search
CPC ..... H04W 8/005; H04W 60/00; H04W 28/08; H04L 29/08
(Continued)

(56) References Cited

U.S. PATENT DOCUMENTS 8,737,314 B2   5/2014  Stamoulis et al.
2004/0146006 A1*  7/2004  Jackson .............. H04L 12/2602
                                                        370/230
(Continued)

FOREIGN PATENT DOCUMENTS

CN        101102281 A      1/2008
CN        101212391 A      7/2008
(Continued)

OTHER PUBLICATIONS

"Integrated Femto-WiFi (IFW) Networks," Small Cell Forum Ltd., United Kingdom (Feb. 28, 2012).

*Primary Examiner* — Kevin T Bates
*Assistant Examiner* — Mark A Scott
(74) *Attorney, Agent, or Firm* — Leydig, Voit & Mayer, Ltd.

(57) ABSTRACT

Embodiments of the present invention relate to a data shunting method, a data transmission device and a shunting node device, the data shunting method provided in the embodiments of the present invention includes: acquiring the number of to-be-transmitted shunted data packets which are cached in the shunting node device; when the number of the to-be-transmitted shunted data packets is less than a first threshold value, transmitting shunted data to the shunting node device, otherwise, not transmitting the shunted data to the shunting node device. The data shunting method provided in the embodiments of the present invention enables the data transmission device to provide the shunting node device with an appropriate shunted data rate.

16 Claims, 2 Drawing Sheets

--- acquiring the number of to-be-transmitted shunted data packets which are cached in a shunting node device  — 101 determining whether the number of the to-be-transmitted shunted data packets is less than a first threshold value, if less than the first threshold value, then transmitting shunted data to the shunting node device  — 102

(51) Int. Cl.
*H04W 40/34* (2009.01)
*H04W 64/00* (2009.01)
*H04L 29/08* (2006.01)

(58) Field of Classification Search
USPC .......................................................... 709/213
See application file for complete search history.

(56) References Cited

U.S. PATENT DOCUMENTS

| | | | | |
|---|---|---|---|---|
| 2005/0176430 A1* | 8/2005 | Lee | | H04W 72/1284 455/436 |
| 2005/0198448 A1* | 9/2005 | Fevrier | | G06F 9/544 711/154 |
| 2005/0240494 A1* | 10/2005 | Cue | | G06Q 10/107 705/26.1 |
| 2006/0010265 A1* | 1/2006 | Aiken | | H04L 29/06 710/33 |
| 2006/0271557 A1* | 11/2006 | Harward | | G06F 9/52 |
| 2007/0206598 A1* | 9/2007 | Yamada | | H04L 1/0052 370/392 |
| 2007/0297336 A1* | 12/2007 | Pitcher | | H04L 47/10 370/236 |
| 2008/0069053 A1* | 3/2008 | Kim | | H04W 36/02 370/332 |
| 2008/0069093 A1* | 3/2008 | Maestas | | H04L 63/1416 370/389 |
| 2008/0084851 A1* | 4/2008 | Kim | | H04W 72/048 370/336 |
| 2008/0153422 A1* | 6/2008 | Gilbertas | | H04L 43/0894 455/67.11 |
| 2008/0181241 A1* | 7/2008 | Regan | | H04L 45/02 370/401 |
| 2008/0192710 A1* | 8/2008 | Balachandran | | H04L 47/10 370/338 |
| 2009/0088161 A1* | 4/2009 | Narasimha | | H04W 8/26 455/436 |
| 2009/0113068 A1* | 4/2009 | Fujihira | | H04L 63/08 709/231 |
| 2009/0129381 A1* | 5/2009 | Schindler | | H04L 12/6418 370/389 |
| 2009/0216897 A1* | 8/2009 | Wang | | H04N 21/2343 709/231 |
| 2010/0254340 A1* | 10/2010 | Park | | H04W 72/1284 370/329 |
| 2011/0007693 A1* | 1/2011 | Frusina | | H04L 5/003 370/329 |
| 2011/0044218 A1* | 2/2011 | Kaur | | H04W 76/16 370/310 |
| 2011/0093913 A1* | 4/2011 | Wohlert | | H04L 63/101 726/1 |
| 2011/0164589 A1* | 7/2011 | Lee | | H04W 36/02 370/331 |
| 2011/0191551 A1* | 8/2011 | Shinozaki | | G06F 12/00 711/154 |
| 2011/0205980 A1* | 8/2011 | Prakash | | H04W 28/26 370/329 |
| 2011/0228676 A1* | 9/2011 | Zhao | | H04W 28/08 370/236 |
| 2011/0296006 A1* | 12/2011 | Krishnaswamy | | H04L 47/125 709/224 |
| 2012/0026865 A1* | 2/2012 | Fan | | H04W 76/02 370/225 |
| 2012/0069805 A1* | 3/2012 | Feuersanger | | H04W 72/1284 370/329 |
| 2012/0127930 A1* | 5/2012 | Nguyen | | H04W 74/002 370/329 |
| 2012/0163298 A1* | 6/2012 | Zhou | | H04W 40/02 370/328 |
| 2012/0166618 A1* | 6/2012 | Dahod | | H04L 47/20 709/224 |
| 2012/0260296 A1* | 10/2012 | Mallet | | H04L 47/38 725/62 |
| 2012/0294203 A1* | 11/2012 | Koorapaty | | H04W 1/0002 370/280 |
| 2013/0007814 A1* | 1/2013 | Cherian | | H04L 65/605 725/62 |
| 2013/0021968 A1* | 1/2013 | Reznik | | H04W 36/026 370/328 |
| 2013/0064198 A1* | 3/2013 | Krishnaswamy | | H04W 76/025 370/329 |
| 2013/0095806 A1* | 4/2013 | Salkintzis | | H04W 72/1215 455/414.3 |
| 2013/0111038 A1* | 5/2013 | Girard | | H04L 45/245 709/226 |
| 2013/0132603 A1* | 5/2013 | Cohen | | H04L 1/1841 709/231 |
| 2013/0132604 A1* | 5/2013 | Cohen | | H04W 76/025 709/231 |
| 2013/0176988 A1* | 7/2013 | Wang | | H04W 28/08 370/331 |
| 2013/0195106 A1* | 8/2013 | Calmon | | H04B 7/15521 370/389 |
| 2013/0201857 A1* | 8/2013 | Bhargava | | H04K 3/222 370/252 |
| 2013/0232534 A1* | 9/2013 | Salkintzis | | H04W 76/026 725/116 |
| 2013/0242843 A1* | 9/2013 | Kojima | | H04W 4/06 370/312 |
| 2013/0279335 A1* | 10/2013 | Ahmadi | | H04W 28/0205 370/235 |
| 2013/0315235 A1* | 11/2013 | Foo | | H04L 67/146 370/389 |
| 2014/0025839 A1* | 1/2014 | Marko | | H04H 20/42 709/231 |
| 2014/0051393 A1* | 2/2014 | Mildh | | H04W 76/10 455/411 |
| 2014/0153489 A1* | 6/2014 | Perras | | H04W 60/00 370/328 |
| 2014/0241367 A1* | 8/2014 | Ichino | | H04L 45/02 370/392 |
| 2014/0244855 A1* | 8/2014 | Howes, Jr. | | H04L 65/60 709/231 |
| 2014/0310381 A1* | 10/2014 | Koo | | H04L 67/10 709/217 |
| 2015/0049689 A1* | 2/2015 | Seo | | H04L 5/005 370/329 |
| 2015/0117342 A1* | 4/2015 | Loehr | | H04W 72/1284 370/329 |
| 2015/0139056 A1* | 5/2015 | Wang | | H04W 48/08 370/311 |

FOREIGN PATENT DOCUMENTS

| | | |
|---|---|---|
| CN | 101335709 A | 12/2008 |
| CN | 101946471 A | 1/2011 |
| EP | 2091188 A1 | 8/2009 |
| EP | 2709418 A2 | 3/2014 |
| WO | WO 2011144061 A2 | 11/2011 |
| WO | WO 2011157129 A2 | 12/2011 |

* cited by examiner

DATA SHUNTING METHOD, DATA TRANSMISSION DEVICE, AND SHUNTING NODE DEVICE

CROSS-REFERENCE TO RELATED APPLICATIONS

This application is a continuation of International Patent Application No. PCT/CN2012/079150, filed on Jul. 25, 2012, which is hereby incorporated by reference in its entirety.

TECHNICAL FIELD

The present invention relates to wireless communication technologies and, in particular, to a data shunting method, a data transmission device and a shunting node device.

BACKGROUND

With a surge of mobile network traffic, in order to make better use of wireless channel resources, a data transmission device in the network will transmit one portion of downlink data to a target device directly, and transmit the other portion of downlink data to the target device via a shunting node device by way of shunting downlink data. For example, a long term evolution (briefly as LTE) network can shunt a portion of downlink data to other different frequency wireless networks, such as a wireless broadband (briefly as WiFi) and a different frequency LTE network.

Specifically, in the LTE network, an LTE base station transmits one portion of downlink data to a target user equipment (briefly as UE) via an LTE air-interface directly, and shunts the other portion of data to a wireless broadband access point (briefly as WiFi AP) and then transmits it to the target UE via a WiFi air-interface, or shunts the other portion of downlink data to a supporting user equipment (briefly as Supporting UE) via the LTE air-interface and then transmits it to the target UE via WiFi or other air-interfaces, and finally merges the two portions of shunted data at a target UE side; in a long term evolution macro base station (briefly as LTE Macro) network, an LTE Macro transmits one portion of its downlink data to a target UE via an LTE Macro air-interface directly, and shunts the other portion to a long term evolution pico base station (briefly as LTE Pico) and then transmits it to the target UE via an LTE Pico air-interface, and merges the two portions of shunted data at a target UE side.

During a process of implementing embodiments of the present invention, the inventors found that, in such a shunting architecture, a data transmission device has a problem in how to determine a rate at which data is shunted to a shunting node device, if the shunting rate is greater than the transmission rate of the shunting node device to a target UE, a congestion of data packets will be caused in the shunting node device, thereby resulting in increased data packet delays, even a packet loss; on the contrary, if the shunting rate is less than the transmission rate of the shunting node device to a target UE, a waste of resources will be caused in the shunting node device. According to the prior art, the data transmission device is unable to provide an appropriate shunted data rate for the shunting node device.

SUMMARY

Embodiments of the present invention provide a data shunting method, a data transmission device and a shunting node device, and an appropriate shunted data rate can be provided for the shunting node device by using the data shunting method in embodiments of the present invention.

An aspect of embodiments of the present invention provides a data shunting method, including:
acquiring the number of to-be-transmitted shunted data packets which are cached in a shunting node device; and
transmitting shunted data to the shunting node device when the number of the to-be-transmitted shunted data packets is less than a first threshold value.

In one aspect, the method for acquiring the number of the to-be-transmitted shunted data packets which are cached in the shunting node device includes:
receiving shunted data packet report information transmitted by a user equipment, wherein the shunted data packet report information comprises a shunting node identifier, and an identifier list of data packets received by the user equipment from the shunting node device or an identifier of a last data packet received by the user equipment from the shunting node device; and
acquiring the number of the to-be-transmitted shunted data packets which are cached in the shunting node device according to data packet information which has been shunted to the shunting node device, and the identifier list of the data packets received by the user equipment from the shunting node device or the identifier of the last data packet received from the shunting node device.

Furthermore, before the receiving of the shunted data packet report information transmitted by the user equipment, further including:
transmitting a first report instruction message to the user equipment, wherein the first report instruction message is used to instruct the user equipment to transmit the shunted data packet report information according to a preset cycle, or is used to instruct the user equipment to transmit the shunted data packet report information every time when receiving a preset number of data packets.

Furthermore, the shunted data packet report information also includes a history data rate of receiving a shunted data packet by the user equipment from the shunting node device.

In another aspect, the method for acquiring the number of the to-be-transmitted shunted data packets which are cached in the shunting node device includes:
receiving cache status report information transmitted by the shunting node device, and acquiring the number of the to-be-transmitted shunted data packets which are cached in the shunting node device from the cache status report information.

Furthermore, before the receiving the cache status report information transmitted by the shunting node device, further including: transmitting a second report instruction message to the shunting node device, wherein the second report instruction message is used to instruct the shunting node device to transmit the cache status report information according to a preset cycle, or is used to instruct the shunting node device to transmit the cache status report information every time when transmitting a preset number of data packets.

Furthermore, the cache status report information also includes a history data rate of transmitting shunted data packets by the shunting node device, the number of the to-be-transmitted shunted data packets which are cached in the shunting node device for a single user equipment, and a history data rate of transmitting shunted data packet by the shunting node device for a single user equipment.

Furthermore, according to the data shunting method as described above, when the number of the to-be-transmitted shunted data packets is greater than or equal to the first threshold value, not transmitting shunted data to the shunting node device.

An aspect of embodiments of the present invention provides another data shunting method, including:

receiving a first report instruction message transmitted by a data transmission device, wherein the first report instruction message is used to instruct the user equipment to transmit shunted data packet report information according to a preset cycle, or is used to instruct the user equipment to transmit shunted data packet report information every time when receiving a preset number of data packets; and transmitting the shunted data packet report information to the data transmission device according to the preset cycle, or transmitting the shunted data packet report information to the data transmission device every time when receiving the preset number of data packets, wherein the shunted data packet report information comprises a shunting node identifier, and an identifier list of data packets received by the user equipment from the shunting node device or an identifier of a last data packet received by the user equipment from the shunting node device.

Furthermore, the shunted data packet report information also includes a history data rate of receiving shunted data packets by the user equipment from the shunting node device.

Another aspect of embodiments of the present invention also provides a data shunting method, including:

receiving a second report instruction message transmitted by a data transmission device, wherein the second report instruction message is used to instruct a shunting node device to transmit cache status report information according to a preset period, or is used to instruct a shunting node device to transmit cache status report information every time when transmitting a preset number of data packets; and transmitting the cache status report information to a data shunting device according to the preset cycle, or transmitting the cache status report information to a data shunting device every time when transmitting the preset number of data packets, where the number of to-be-transmitted shunted data packets which are cached in the shunting node device are carried in the cache status report information.

Furthermore, the cache status report information also includes a history data rate of transmitting shunted data packets by the shunting node device, the number of the to-be-transmitted shunted data packets which are cached in the shunting node device for a single user equipment, and a history data rate of transmitting shunted data packets by the shunting node device for a single user equipment.

According to the data shunting method provided in the present invention, whether it needs to transmit data to the shunting node device is determined by acquiring to-be-transmitted data packet information which is cached in the shunting node device, when to-be-transmitted shunting data information which is cached in the shunting node device is less than a preset value, it indicates that a buffer of the shunting node device has a larger space, thus the shunting node device can receive more data and then transmit to a user equipment, on the other hand, transmission rate from the shunting node device to the user equipment is also improved; when to-be-transmitted shunting data information which is cached in the shunting node device is greater than a preset value, it indicates that a buffer of the shunting node device is busy, in order to avoid phenomena such as increased data packet delays or even a packet loss resulting from congestion of the data packets in the shunting node device, the data transmission device will not continue to transmit data to the shunting node device.

Another aspect of embodiments of the present invention provides a data transmission device, including:

a first acquiring module, configured to acquire the number of to-be-transmitted shunted data packets which are cached in a shunting node device; and a shunting control module, configured to transmit shunted data to the shunting node device when the number of the to-be-transmitted shunted data packets is less than a first threshold value.

In one aspect, the first acquiring module includes:

a first receiving unit, configured to receive shunted data packet report information transmitted by a user equipment, wherein the shunted data packet report information comprises a shunting node identifier, and an identifier list of data packets received by the user equipment from the shunting node device or an identifier of a last data packet received by the user equipment from the shunting node device; and a first acquiring unit, configured to acquire the number of the to-be-transmitted shunted data packets which are cached in the shunting node device according to data packet information which has been shunted to the shunting node device, and the identifier list of the data packets received by the user equipment from the shunting node device or the identifier of the last data packet received by the user equipment from the shunting node device.

Furthermore, the data transmission device also includes:

a first transmitting module, configured to transmit a first report instruction message to the user equipment, wherein the first report instruction message is used to instruct the user equipment to transmit the shunted data packet report information according to a preset cycle, or is used to instruct the user equipment to transmit the shunted data packet report information every time when receiving a preset number of data packets.

In another aspect, the first acquiring module includes:

a second receiving unit, configured to receive cache status report information transmitted by the shunting node device, and a second acquiring unit, configured to acquire the number of the to-be-transmitted shunted data packets which are cached in the shunting node device from the cache status report information.

Furthermore, the data transmission device also includes:

a second transmitting module, configured to transmit a second report instruction message to the shunting node device, wherein the second report instruction message is used to instruct the shunting node device to transmit the cache status report information according to a preset cycle, or is used to instruct the shunting node device to transmit the cache status report information every time when transmitting a preset number of data packets.

According to the data transmission device as described above, the shunting control module is also configured to, when the number of the to-be-transmitted shunted data packets is greater than or equal to the first threshold value, not transmit shunted data to the shunting node device.

According to the data transmission device provided in embodiments of the present invention, whether it needs to continue to shunt data to the shunting node device is determined through acquiring the number of to-be-transmitted data packets which are cached in the shunting node device, thus, transmission rate of the shunting node device is improved, and a buffer in the shunting node device is fully utilized.

Another method of the present invention is to provide a user equipment, including:

a first receiving module, configured to receive a first report instruction message transmitted by a data transmission device, wherein the first report instruction message is used to instruct the user equipment to transmit shunted data packet report information according to a preset cycle, or is used to instruct the user equipment to transmit shunted data packet report information every time when receiving a preset number of data packets; and a third transmitting module, configured to transmit shunted data packet report information to the data transmission device according to the preset cycle, or transmit the shunted data packet report information to the data transmission device every time when receiving the preset number of data packets, wherein the shunted data packet report information comprises a shunting node identifier, and an identifier list of data packets received by the user equipment from the shunting node device or an identifier of a last data packet received by the user equipment from the shunting node device.

According to the user equipment provided in embodiments of the present invention, the user equipment reports the number of data packets received by the user equipment from the shunting node device to the data transmission device, thereby enabling the data transmission device to estimate the number of to-be-transmitted data packets which are cached in the shunting node device, thus, transmission rate from the shunting node device to the user equipment can be improved.

Another method of the present invention is to provide a shunting node device, including:

a second receiving module, configured to receive a second report instruction message transmitted by a data transmission device, wherein the second report instruction message is used to instruct a shunting node device to transmit cache status report information according to a preset period, or is used to instruct a shunting node device to transmit cache status report information every time when transmitting a preset number of data packets; and a fourth transmitting module, configured to transmit cache status report information to a data shunting device according to the preset cycle, or transmit cache status report information to a data shunting device every time when transmitting the preset number of data packets, where the number of to-be-transmitted shunted data packets which are cached in the shunting node device are carried in the cache status report information.

According to the shunting node device provided in embodiments of the present invention, the shunting node device reports the number of to-be-transmitted data packets which are cached in a buffer of the shunting node device to the data transmission device, thereby enabling the data transmission device to determine whether it needs to continue data shunting to the shunting node device, thus, transmission rate from the shunting node device to the user equipment can be improved, data packets which are cached in shunting node device are ensured to be refrained from time delays, and efficient use of spectrum resources of the shunting node device can also be ensured.

BRIEF DESCRIPTION OF DRAWINGS

In order to make technical solutions in embodiments of the present invention more clearly, the accompanying drawings used in the description of the embodiments will be briefly described hereunder. Obviously, the described drawings are merely some embodiments of present invention. For persons skilled in the art, other drawings may be obtained based on these drawings without any inventive effort.

DESCRIPTION OF EMBODIMENTS

Technical solutions in embodiments of the present invention will be described comprehensively and clearly hereunder with reference to accompanying drawings in embodiments of the present invention. Obviously, the described embodiments are only a part of embodiments of the present invention, rather than all embodiments of the present invention. All the other embodiments obtained by persons of ordinary skill in the art based on embodiments of the present invention without any inventive efforts shall fall within the protection scope of the present invention.

Figure 1:
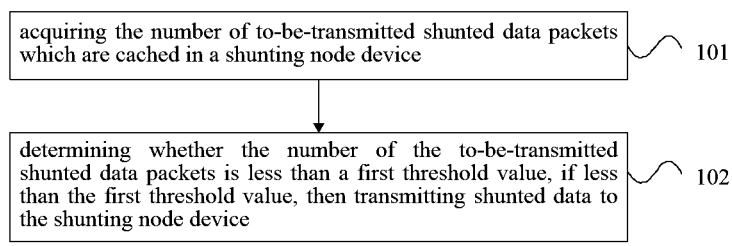
FIG. 1 is a first schematic flow chart of a data shunting method according to an embodiment of the present invention.

Embodiments of the present invention provide a data shunting method. FIG. 1 is a first schematic flow chart of a data shunting method according to an embodiment of the present invention, as shown in FIG. 1, the method includes the following steps:

Step 101: acquiring the number of to-be-transmitted shunted data packets which are cached in a shunting node device.

Theoretically, within a same time period, the number of shunted data packets which are transmitted to a shunting node device by a data transmission device such as a base station should be identical to the number of shunted data packets which are received by a user equipment from the shunting node device, that is, transmission rate from the base station to the shunting node device should be identical to transmission rate from the shunting node device to the user equipment, however, during actual transmission, the shunted data packets received by the shunting node device will firstly be stored in a buffer on the shunting node device temporarily, and then data packet information is taken out from the buffer and transmitted to the user equipment, during the cache process, if the number of to-be-transmitted shunted data packets which are cached in the shunting node device is too big or too small, the transmission rate from the shunting node device to the user equipment will be affected, therefore, the number of the to-be-transmitted shunted data packets which are cached in the shunting node device must be acquired firstly, then whether to continue transmitting the data packet information to the shunting node device by the data transmission device is determined according to the number of the to-be-transmitted shunted data packets which are cached in the shunting node device.

According to embodiments of the present invention, transmission rate is determined mainly by the data transmission device through estimating data amount in a shunting buffer on the shunting node device, since whether a link from the shunting node device to a target UE is congested or idle is embodied in amount of to-be-shunted data in the buffer of the shunting node device.

Step 102: determining whether the number of the to-be-transmitted shunted data packets is less than a first threshold value, if less than the first threshold value, then transmitting shunted data to the shunting node device.

If the number of the to-be-transmitted shunted data packets in the shunting node device is less than the first threshold value, it indicates that amount of to-be-shunted data in the buffer of the shunting node device is small, and storage resources of the shunting node device have a larger idle space, then the data transmission device continues to shunt data packet information to the shunting node device, so that caching resources of the shunting node device can be utilized effectively, on the other hand, the transmission rate from the shunting node device to the user equipment is also improved. On the contrary, when the number of the to-be-transmitted shunted data packets in the shunting node device is greater than or equal to the first threshold value, it indicates that amount of to-be-shunted data in the buffer of the shunting node device is too big, and phenomena such as time delays or packet loss will be produced, on the other hand, the transmission rate from the shunting node device to the user equipment will be reduced, at this time, the data transmission device will not to continue to transmit data to the shunting node device.

Embodiments of the present invention provide at least two methods for acquiring the number of to-be-transmitted shunted data packets which are cached in the shunting node device, where one method specifically is:

receiving, by a data transmission device, shunted data packet report information transmitted by a user equipment, then acquiring the number of the to-be-transmitted shunted data packets which are cached in the shunting node device according to data packet information which has been shunted to the shunting node device and data packet information received by the user equipment from the shunting node device, where the shunted data packet report information includes a shunting node identifier, and an identifier list of the data packets received by the user equipment from the shunting node device or an identifier of the last data packet received by the user equipment from the shunting node device.

Specifically, the data transmission device can estimate the number of the to-be-transmitted data packets which are cached in the shunting node device according to the number of the data packets transmitted to the shunting node device and the shunted data packet report information received from the user equipment, where the shunted data packet report information includes a shunting node identifier, and an identifier list of the data packets received by the user equipment from the shunting node device or an identifier of the last data packet received by the user equipment from the shunting node device. The shunting node identifier may be an MAC address, an IP address or other identifiers of the shunting node device. The identifier list of the data packets may be a TCP, an IP layer sequence number or other identifiers.

Furthermore, before receiving the shunted data packet report information transmitted by the user equipment, transmit a first report instruction message to the user equipment, where the first report instruction message is used to instruct the user equipment to transmit the shunted data packet report information according to a preset cycle, or is used to instruct the user equipment to transmit the shunted data packet report information every time when receiving a preset number of data packets.

Specifically, before transmitting the shunted data packet report information to the data transmission device by the user equipment, the data transmission device transmits a first report instruction message to the user equipment firstly, where the first report instruction message is used to instruct the user equipment to feed back data packet information received from a current shunting node device by the user equipment to the data transmission device on a cycle of T; or the first report instruction message may also be used to instruct the user equipment to feed back shunted data packet information received by the user equipment to the data transmission device when the number of data packet information received by the user equipment from the shunting node device exceeds a preset value.

Furthermore, the shunted data packet report information also includes a history data rate of receiving shunted data packets from the shunting node device by the user equipment.

Specifically, the shunted data packet report information which is transmitted by the user equipment and received by the data transmission device also includes a history data rate in addition to the shunting node identifier and the identifier list of the data packets received by the user equipment from the shunting node device, or the identifier of the last data packet received by the user equipment from the shunting node device, where the history data rate may be obtained according to data amount received by the user equipment from the shunting node device per unit time.

History of a data rate of receiving shunted data packets by the shunting node device provided in embodiments of the present invention is used to provide a reference for the data transmission device, where the data transmission device can estimate whether it needs to continue to shunt data to the shunting node device according to the history data rate.

Embodiments of the present invention also provides another method for acquiring the number of the to-be-transmitted shunted data packets which are cached in the shunting node device, the method specifically is:

receiving cache status report information transmitted by the shunting node device, where the cache status report information includes the number of the to-be-transmitted shunted data packets which are cached in the shunting node device.

Specifically, the data transmission device receives cache status report information transmitted by the shunting node device, where the cache status report information includes the number of the to-be-transmitted shunted data packets which are cached in the shunting node device, whereby the data transmission device can acquire the number of the to-be-transmitted shunted data packets which are cached in the shunting node device directly, thus, the data transmission device can determine whether it needs to continue to transmit data to the shunting node device according to the received cache status report information.

Furthermore, before the data transmission device receives the cache status report information transmitted by the shunting node device, the data transmission device also transmits a second report instruction message to the shunting node device, where the second report instruction message is used to instruct the shunting node device to transmit cache status report information according to a preset cycle, or is used to instruct the shunting node device to transmit cache status report information every time when transmitting a preset number of data packets.

Specifically, the data transmission device transmits a second report instruction message to the shunting node device firstly, and then the shunting node device transmits the cache status report information to the data transmission device according to the second report instruction message received. The second report instruction message is used to instruct the shunting node device to transmit the cache status report information to the data transmission device by a cycle of T, the cache status report information shows the number of shunted data packets transmitted by the current shunting node device to the user equipment; or the second report instruction message may also be used to instruct the shunting node device to transmit cache status report information every time when transmitting a preset number of data packets, specifically, the data transmission device instructs the shunting node device to continue to shunt data to the shunting node device, that is, continue to transmit data packets to the shunting node device when the number of the to-be-transmitted data packets which are cached in the shunting node device is less than a preset value, and instruct the shunting node device to stop shunting data to the shunting node device, that is, stop transmitting data packet to the shunting node device when the number of the to-be-transmitted data packets which are cached in the shunting node device is greater than a preset value.

Furthermore, the cache status report information which is transmitted by the shunting node device and received by the data transmission device also includes a history data rate of transmitting shunted data packets by the shunting node device, the number of to-be-transmitted shunted data packets which are cached in the shunting node device for a single user equipment, and a history data rate of transmitting shunted data packets by the shunting node device for a single user equipment.

Specifically, the cache status report information which is transmitted by the shunting node device and received by the data transmission device, also includes a history data rate of transmitting shunted data packets by the shunting node device, the number of to-be-transmitted shunted data packets which are cached in the shunting node device for a single user equipment, and a history data rate of transmitting shunted data packets by the shunting node device for a single user equipment in addition to the number of the to-be-transmitted shunted data packets which are cached in the shunting node device.

The history data rate of transmitting the shunted data packets by the shunting node device, the number of the to-be-transmitted shunted data packets which are cached in the shunting node device for a single user equipment, and the history data rate of transmitting the shunted data packets by the shunting node device for a single user equipment provided in embodiments of the present invention can be used as a reference parameter for determining whether the data transmission device needs to continue to transmit data to the shunting node device; the data transmission device can estimate whether it needs to continue to shunt data to the shunting node device according to the history data rate of transmitting the shunted data packets by the shunting node device; the data transmission device can also estimate whether it needs to transmit data packet information of a single user equipment to other shunting node devices according to the number of the to-be-transmitted shunted data packets which are cached in the shunting node device by the individual user equipment, so that the other shunting node devices transmit data to the single user equipment; or the data transmission device can also estimate whether it needs to shunt data to other shunting node devices according to the history data rate of transmitting the shunted data packets by the shunting node device for the individual user equipment, so that the other shunting node devices transmit data to the single user equipment.

Figure 2:
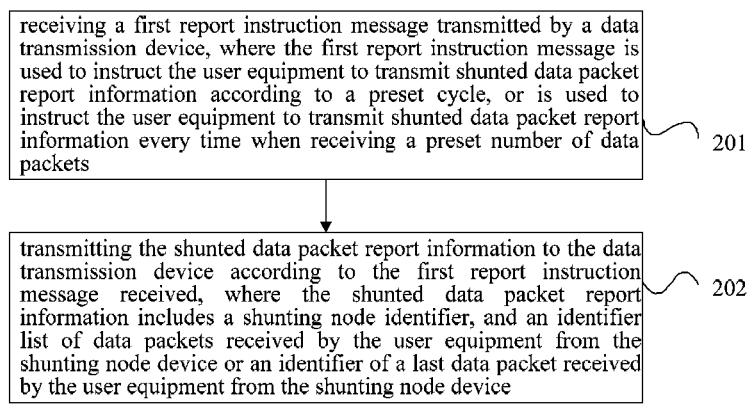
FIG. 2 is a second schematic flow chart of a data shunting method according to an embodiment of the present invention.

Embodiments of the present invention provide a data shunting method. FIG. 2 is a second schematic flow chart of a data shunting method according to an embodiment of the present invention, as shown in FIG. 2, the method includes the following steps:

Step 201: receiving, by a user equipment, a first report instruction message transmitted by a data transmission device, where the first report instruction message is used to instruct the user equipment to transmit shunted data packet report information according to a preset cycle, or is used to instruct the user equipment to transmit shunted data packet report information every time when receiving a preset number of data packets.

Specifically, the user equipment receives a first report instruction message transmitted by the data transmission device, where the first report instruction message is used to instruct the user equipment to feed back shunted data packet report information to the data transmission device by a cycle of T, or the first report instruction message may also be used to instruct the user equipment to feed back shunted data packet report information to the data transmission device by a preset threshold.

Step 202: transmitting, by the user equipment, the shunted data packet report information to the data transmission device according to the first report instruction message received, where the shunted data packet report information includes a shunting node identifier, and an identifier list of data packets received by the user equipment from the shunting node device or an identifier of a last data packet received by the user equipment from the shunting node device.

Specifically, no matter whether the user equipment transmits shunted data packet report information to the data transmission device by a cycle of T or by a preset threshold, the shunted data packet report information includes a shunting node identifier, and an identifier list of the data packets received by the user equipment from the shunting node device or an identifier of the last data packet received by the user equipment from the shunting node device. The shunting node identifier may be an MAC address, an IP address or other identifiers of the shunting node device. The identifier list of the data packets may be a TCP, an IP layer sequence number or other identifiers.

Furthermore, the shunted data packet report information also includes a history data rate of receiving shunted data packets by the user equipment from the shunting node device.

In summary, in order to determine whether the data transmission device needs to continue to shunt data to the shunting node device, in embodiments of the present invention, it can be determined through the following methods:

Firstly, the data transmission device configures a feedback cycle T of an OPRR for the user equipment via the first report instruction message, and a specific type of the first report instruction message which is used to configure the parameter is not limited.

Secondly, the user equipment feeds back shunted data packet report OPRR information received from the shunting node device to the data transmission device by a cycle of T. The OPRR information may include: a shunting node identifier, an identifier list of data packets received or an identifier ID of the last data packet received, and a history data rate value R received from the shunting node device. The shunting node identifier may be an MAC address, an IP address or other identifiers of the shunting node device. The identifier of a data packet may be a TCP, an IP layer sequence number or other identifiers. The history data rate value R may be estimated according to the amount of data received by a UE from the shunting node device within a time period.

Then, the data transmission device can estimate the number of to-be-shunted data packets in a buffer of the shunting node device according to the data packet information included in the OPRR and the data packet information shunted to the shunting node device. For example, if the data transmission device has shunted 100 data packets to the shunting node device, while it is known that the user equipment has received 40 data packets from the shunting node device according to the OPRR information reported by the user equipment, then the data transmission device can estimate that the shunting node device still has 60 data packets to be transmitted. The data transmission device can decide whether to shunt to the shunting node device according to the estimated information about the number of data packets which are cached in the buffer. For instance, when the number of data packets is less than a threshold, e.g. less than 10 data packets, data will be shunted to the shunting node device; otherwise, data will not be shunted to the shunting node device.

According to the data shunting method provided in embodiments of the present invention, whether the data transmission device needs to continue to shunt data to the shunting node device is determined through feeding back data packet information received from the shunting node device to the data transmission device by the user equipment by a preset cycle, when the number of to-be-transmitted data packets which are cached in the shunting node device is greater than a preset value, transmitting data to the shunting node device is not continued, thus data packets in the buffer of the shunting node device will not cause phenomena, such as congestion or increased data packet delays or even a packet loss, which affects the transmission rate from the shunting node device to the user equipment, in another aspect, the method for shunting data provided in embodiments of the present invention improves the transmission rate of the shunting node device; when the number of to-be-transmitted data packets which are cached in the shunting node device is less than a preset value, the data transmission device continues to transmit data to the shunting node device, so that the buffer of the shunting node device is fully utilized, in another aspect, the transmission rate of the shunting node device is also improved.

Embodiments of the present invention still provide a method for determining whether it needs to continue to shunt data to the shunting node device, the method specifically is:

Firstly, the data transmission device configures a feedback threshold N of an OPRR for the user equipment via a first report instruction message, where the first report instruction message which is used to configure the parameter is not limited.

Secondly, starting from last feedback, when the accumulated number of data packets received by the user equipment from the shunting node device exceeds N, then the user equipment feeds back data packet report OPRR information received from the shunting node device to the data transmission device. The OPRR information may include: a shunting node identifier, an identifier list of the data packets received or an identifier ID of the last data packet received, and a history data rate value R received from the shunting node device. The shunting node identifier may be an MAC address, an IP address or other identifiers of the shunting node device. The identifier of the data packets may be a TCP, an IP layer sequence number or other identifiers. The history data rate value R can be estimated according to the amount of data received by a UE from the shunting node device within a time period.

Then, the data transmission device can estimate the number of to-be-shunted data packets in a buffer of the shunting node device according to the data packet information included in the OPRR and the data packet information shunted to the shunting node device. For example, if the data transmission device has shunted 100 data packets to the shunting node device, while it is known that the user equipment has received 40 data packets from the shunting node device according to the OPRR information reported by the user equipment, then the data transmission device can estimate that the shunting node device still has 60 data packets to be transmitted. The data transmission device can decide whether to shunt to the shunting node device according to the estimated information about the number of data packets which are cached in the buffer. For instance, when the number of data packets is less than a threshold, e.g. less than 10 data packets, data is shunted to the shunting node device; otherwise, data is not shunted to the shunting node device.

According to the method for shunting data provided in embodiments of the present invention, by means of feeding back received shunted data packet report information to the data transmission device by the user equipment when the number of data packets received reaches a preset number from the last feedback, the data transmission device is enabled to estimate the number of to-be-transmitted data packets which are cached in the shunting node device according to the total number of data packets transmitted to the shunting node device, thus the data transmission device decides whether it needs to continue to shunt data to the shunting node device, thereby improving the transmission rate of the shunting node device.

Figure 3:
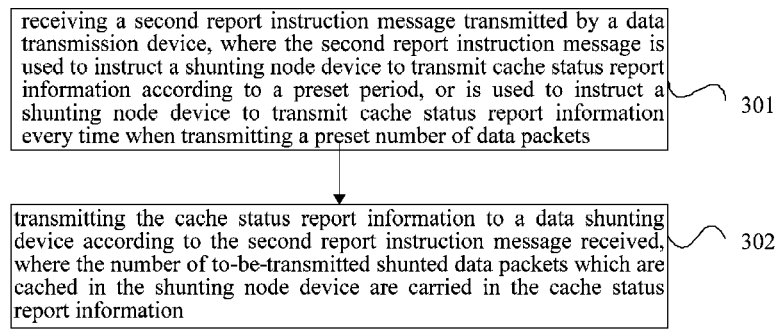
FIG. 3 is a third schematic flow chart of a data shunting method according to an embodiment of the present invention.

Embodiments of the present invention provide a data shunting method. FIG. 3 is a third schematic flow chart of a data shunting method according to an embodiment of the present invention, as shown in FIG. 3, the method includes the following steps:

Step 301: receiving a second report instruction message transmitted by a data transmission device, where the second report instruction message is used to instruct a shunting node device to transmit cache status report information according to a preset period, or is used to instruct a shunting node device to transmit cache status report information every time when transmitting a preset number of data packets.

Specifically, the shunting node device receives a second report instruction message transmitted by the data transmission device, where the second report instruction message is used to instruct the shunting node device to feed back cache status report information to the data transmission device by a cycle of T, or the second report instruction message may also be used to instruct the shunting node device to feed back cache status report information to the data transmission device by a data threshold.

Step 302: transmitting the cache status report information to a data shunting device according to the second report instruction message received, where the number of to-betransmitted shunted data packets which are cached in the shunting node device are carried in the cache status report information.

Specifically, no matter whether the shunting node device transmits cache status report information to the data transmission device by a cycle of T or by a data threshold, the cache status report information includes the number of to-be-transmitted shunted data packets.

Furthermore, the cache status report information also includes a history data rate of transmitting the shunted data packets by the shunting node device, the number of the to-be-transmitted shunted data packets which are cached in the shunting node device for a single user equipment, and a history data rate of transmitting the shunted data packets by the shunting node device for a single user equipment.

In summary, embodiments of the present invention still provide a method for determine whether it needs to continue to shunt data to the shunting node device, the method specifically is:

Firstly, the data transmission device configures an OBSR feedback cycle T and an OBSR quantization table for the shunting node device via a second report instruction message, where the second report instruction message which is used to configure the parameter is not limited.

Secondly, the shunting node device feeds back shunting buffer status report OBSR information of a current shunting node device to the data transmission device by a cycle of T. The OBSR may include: the number of to-be-shunted data packets in a buffer, the number of to-be-shunted data packets in the shunting node device of a single user equipment, a history total shunting rate Rt of the shunting node device, a history shunting rate r from the shunting node device to a single user equipment. In order to reduce size of the OBSR, the fed back data amount in the buffer is quantized. The shunting history data rates Rt and r can be estimated according to the data amount successfully shunted by the shunting node device from the shunting node device within a time period.

Then, the data transmission device receives the OBSR information transmitted by the shunting node device, obtains information about the number of to-be-shunted data packets in the buffer of the shunting node device, and decides whether to shunt to the shunting node device according to the information about the number of data packets. For instance, when data amount is less than a threshold, e.g., less than 10 data packets, data will be shunted to the shunting node device; otherwise, data will not be shunted to the shunting node device.

According to the data shunting method provided in embodiments of the present invention, whether the data transmission device needs to continue to shunt data to the shunting node device is determined through feeding back the number of to-be-transmitted data packets which are cached in the buffer of the shunting node device to the data transmission device by the shunting node device by a preset cycle, when the number of to-be-transmitted data packets which are cached in the shunting node device is greater than a preset value, transmitting data to the shunting node device is not continued, thus data packets in the buffer of the shunting node device will not cause phenomena, such as congestion or increased data packet delays or even a packet loss, which affects the transmission rate from the shunting node device to the user equipment, in another aspect, the method for shunting data provided in embodiments of the present invention improves the transmission rate of the shunting node device; when the number of to-be-transmitted data packets which are cached in the shunting node device is less than a preset value, the data transmission device continues to transmit data to the shunting node device, so that the buffer of the shunting node device is fully utilized, in another aspect, the transmission rate of the shunting node device is also improved.

Embodiments of the present invention still provide a method for determining whether it needs to continue to shunt data to the shunting node device, the method specifically is:

Firstly, the data transmission device configures a data amount threshold [B1, B2] and an OBSR quantization table for the shunting node device via a second report instruction message, where the second report instruction message which is used to configure the parameter is not limited.

Secondly, when the number of data packets which are cached in a shunting buffer of the shunting node device is less than B1 or greater than B2, then the shunting node device feeds back shunting buffer status report OBSR information of a current shunting node device to the data transmission device. The OBSR information may include: the number of to-be-shunted data packets in a buffer, the number of to-be-shunted data packets in the shunting node device of a single user equipment, a history total shunting history data rate Rt of the shunting node device, a history shunting rate r from the shunting node device to a single user equipment. In order to reduce size of the OBSR, the fed back data amount in the buffer is quantized. The shunting history data rates Rt and r can be estimated according to the data amount successfully shunted by the shunting node device from the shunting node device within a time period.

Then, the data transmission device receives the cache status report OBSR information transmitted by the shunting node device, obtains information about the number of to-be-shunted data packets in the buffer of the shunting node device, and decides whether to shunt to the shunting node device according to the information about the number of data packets. For instance, when the number of data packets is less than a threshold, e.g., less than 10 data packets, data will be shunted to the shunting node device; otherwise, data will not be shunted to the shunting node device.

According to the method for shunting data provided in embodiments of the present invention, by means of feeding back information about the number of to-be-transmitted data packets to the data transmission device by the shunting node device when the number of to-be-transmitted data packets which are cached in its buffer reaches a preset number from the last feedback, the data transmission device is enabled to decide whether it needs to continue data shunting to the shunting node device, thereby improving the transmission rate of the shunting node device.

Persons of ordinary skill in the art may understand that, all or a part of the steps of the foregoing method embodiments may be implemented by a program instructing relevant hardware. The foregoing program may be stored in a computer readable storage medium. When the program runs, the steps of the foregoing method embodiments are performed. The foregoing storage medium includes various mediums capable of storing program codes, such as an ROM, an RAM, a magnetic disk, or an optical disc.

Figure 4:
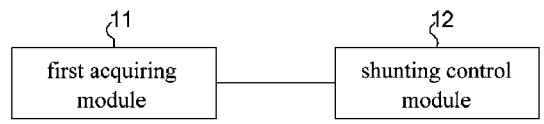
FIG. 4 is a schematic structural diagram of a data transmission device according to an embodiment of the present invention.

Embodiments of the present invention provide a data transmission device. FIG. 4 is a schematic structural diagram of a data transmission device according to an embodiment of the present invention; this device is used to implement the method as shown in the embodiments of FIG. 1 correspondingly, as for details which have been described in the embodiments as shown in FIG. 1, they will not be repeated herein. As shown in FIG. 4, the device includes a first acquiring module 11 and a shunting control module 12, where, the first acquiring module 11 is configured to acquire the number of to-be-transmitted shunted data packets which are cached in a shunting node device; and the shunting control module 12 is configured to transmit shunted data to the shunting node device when the number of the to-be-transmitted shunted data packets is less than a first threshold value, otherwise, not transmit shunted data to the shunting node device.

Specifically, after the first acquiring module 11 of the data transmission device acquires the number of to-be-transmitted shunted data packets which are cached in the shunting node device, the data transmission device can determine whether it needs to continue to shunt data to the shunting node device via the shunting control module 12, when the number of the to-be-transmitted shunted data packets is less than a first threshold, the data transmission device continues to shunt data to the shunting node device, when the number of the to-be-transmitted shunted data packets is greater than a first threshold, the data transmission device stops shunting data to the shunting node device.

The first acquiring module 11 included in the data transmission device according to embodiments of the present invention includes: a first receiving unit and a first acquiring unit, or the first acquiring module 11 includes a second receiving unit and a second acquiring unit.

When the first acquiring module 11 of the data transmission device includes the first receiving unit and the first acquiring unit, the first receiving unit is configured to receive shunted data packet report information transmitted by a user equipment, where the shunted data packet report information includes a shunting node identifier, and an identifier list of data packets received by the user equipment from the shunting node device or an identifier of a last data packet received by the user equipment from the shunting node device; and the first acquiring unit is configured to acquire the number of the to-be-transmitted shunted data packets which are cached in the shunting node device according to data packet information which has been shunted to the shunting node device, and the identifier list of the data packets received by the user equipment from the shunting node device or the identifier of the last data packet received by the user equipment from the shunting node device.

Specifically, after the first receiving unit of the data transmission device receives shunted data packet report information transmitted by the user equipment, the data transmission device estimates the number of to-be-transmitted shunted data packets which are cached in the shunting node device according to the data packet information transmitted by the data transmission device to the shunting node device, where the shunted data packet report information includes a shunting node identifier, and an identifier list of the data packets received by the user equipment from the shunting node device or an identifier of the last data packet received by the user equipment from the shunting node device.

Furthermore, the data transmission device also includes a first transmitting module. The first transmitting module is configured to transmit a first report instruction message to the user equipment, where the first report instruction message is used to instruct the user equipment to transmit the shunted data packet report information according to a preset cycle, or is used to instruct the user equipment to transmit the shunted data packet report information every time when receiving a preset number of data packets.

Specifically, besides the first acquiring module 11 and the shunting control module 12, the data transmission device also includes a first transmitting module. The first transmitting module is configured to transmit a first report instruction message to the user equipment, where the first report instruction message is used to instruct the user equipment to feed back the shunted data packet report information received by the user equipment from a current shunting node device to the data transmission device by a cycle of T; or the first report instruction message may also be used to instruct the user equipment to feed back the shunted data packet report information received by the user equipment from a current shunting node device to the data transmission device by a preset threshold value.

When the first acquiring module of the data transmission device includes a second receiving unit and a second acquiring unit, the second receiving unit is configured to receive cache status report information transmitted by a shunting node device; and the second acquiring unit is configured to acquire the number of the to-be-transmitted shunted data packets which are cached in the shunting node device from the cache status report information.

Specifically, after the second receiving unit included in the first acquiring module of the data transmission device receives cache status report information transmitted by the shunting node device, the data transmission device estimates the number of to-be-transmitted shunted data packets which are cached in the shunting node device according to the data packet information transmitted to the shunting node device, where the cache status report information includes total amount of to-be-shunted data in a buffer of the shunting node device.

Furthermore, the first acquiring module of the data transmission device also includes a second transmitting module. The second transmitting module is configured to transmit a second report instruction message to the shunting node device, where the second report instruction message is used to instruct the shunting node device to transmit the cache status report information according to a preset cycle, or is used to instruct the shunting node device to transmit the cache status report information every time when transmitting a preset number of data packets.

Specifically, besides the first acquiring module 11 and the shunting control module 12, the data transmission device also includes a second transmitting module. The second transmitting module is configured to transmit a second report instruction message to the shunting node device, where the second report instruction message is used to instruct the shunting node device to feed back cache status report information of a current shunting node device to the data transmission device by a cycle of T, where the cache status report information is used to record information about to-be-transmitted data packets which are cached in the current shunting node device; or the second report instruction message may also be used to instruct the shunting node device to feed back cache status report information of a current shunting node device to the data transmission device by a preset threshold value, where the cache status report information is used to record information about to-be-transmitted data packets which are cached in the current shunting node device, specifically, when the number of data packets which are cached in the shunting node device is less than a preset value, the data transmission device continues to shunt to the shunting node device, that is, transmitting the data packets to the shunting node device; when the number of data packets which are cached in the shunting node device is greater than a preset value, the data transmission device stops shunting to the shunting node device, that is, stopping transmitting the data packets to the shunting node device.

Figure 5:
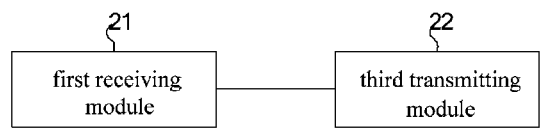
FIG. 5 is a schematic structural diagram of a user equipment device according to an embodiment of the present invention.

Embodiments of the present invention provide a user equipment, FIG. 5 is a schematic structural diagram of a user equipment device according to an embodiment of the present invention, this user equipment is used to implement the method as shown in the embodiments of FIG. 2 correspondingly, as for details which have been described in the embodiments as shown in FIG. 2, they will not be repeated herein. As shown in FIG. 5, the device includes a first receiving module 21 and a third transmitting module 22. The first receiving module 21 is configured to receive a first report instruction message transmitted by a data transmission device, where the first report instruction message is used to instruct the user equipment to transmit shunted data packet report information according to a preset cycle, or is used to instruct the user equipment to transmit shunted data packet report information every time when receiving a preset number of data packets; and the third transmitting module 22 is configured to transmit shunted data packet report information to the data transmission device according to the first report instruction message received, where the shunted data packet report information includes a shunting node identifier, and an identifier list of data packets received by the user equipment from the shunting node device or an identifier of a last data packet received by the user equipment from the shunting node device.

Specifically, the user equipment according to embodiments of the present invention includes a first receiving module 21 and a third transmitting module 22. The first receiving module 21 of the user equipment receives a first report instruction message transmitted by a data transmission device firstly, and then the user equipment transmits shunted data packet report information to the data transmission device according to the first report instruction message received. The first report instruction message is used to instruct the user equipment to feed back the number of data packets received from a current shunting node device to the data transmission device by a cycle of T, or the first report instruction message may also be used to instruct the user equipment to feed back the number of data packets received from a current shunting node device to the data transmission device by a preset value; where the shunted data packet report information includes a shunting node identifier, an identifier list of data packets received by the user equipment from the shunting node device or an identifier of a last data packet received by the user equipment from the shunting node device, and a history data rate of receiving shunted data packets from the shunting node device.

Figure 6:
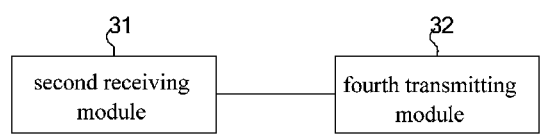
FIG. 6 is a schematic structural diagram of a shunting node device according to an embodiment of the present invention.

Embodiments of the present invention provide a shunting node device, FIG. 6 is a schematic structural diagram of a shunting node device according to an embodiment of the present invention; this shunting node device is used to implement the method as shown in the embodiments of FIG. 3 correspondingly, as for details which have been described in the embodiments as shown in FIG. 3, they will not be repeated herein. As shown in FIG. 6, the device includes a second receiving module 31 and a fourth transmitting module 32. The second receiving module 31 is configured to receive a second report instruction message transmitted by a data transmission device, where the second report instruction message is used to instruct the shunting node device to transmit cache status report information according to a preset cycle, or is used to instruct the shunting node device to transmit cache status report information every time when transmitting a preset number of data packets; and the fourth transmitting module 32 is configured to transmit cache status report information to a data shunting device according to the second report instruction message received, where the number of to-be-transmitted shunted data packets which are cached in the shunting node device are carried in the cache status report information.

Specifically, the shunting node device according to embodiments of the present invention includes a second receiving module 31 and a fourth transmitting module 32. The first receiving module 31 of the shunting node device receives a second report instruction message transmitted by a data transmission device firstly, and then the shunting node device transmits cache status report information to the data transmission device according to the second report instruction message received. The second report instruction message is used to instruct the shunting node device to feed back the number of to-be-transmitted shunted data packets which are cached in a current shunting node device to the data transmission device by a cycle of T, or the second report instruction message may also be used to instruct the shunting node device to feed back the number of to-be-transmitted shunted data packets which are cached in a current shunting node device to the data transmission device by a preset value; the cache status report information carries the number of the to-be-transmitted shunted data packets which are cached in the shunting node device, and may also carries a history data rate of transmitting shunted data packets by the shunting node device, the number of the to-be-transmitted shunted data packets which are cached in the shunting node device for a single user equipment, and a history data rate of transmitting shunted data packets by the shunting node device for a single user equipment.

The data transmission device in embodiments of the present invention may be specifically an LTE eNB, and may also be other types of base station; the shunting node device in embodiments of the present invention may be a wired shunting node device, and may also be a wireless shunting node device. Types of interfaces between the shunting node device and the user equipment provided in embodiments of the present invention include but are not limited to WiFi, LTE D2D and LTE-Hi.

Finally, it should be noted that the foregoing embodiments are merely intended for describing technical solutions of the present invention rather than limiting the present invention. Although the present invention is described in detail with reference to the foregoing embodiments, persons of ordinary skill in the art should understand that they may still make modifications to the technical solutions described in the foregoing embodiments, or make equivalent replacements to some technical features thereof however, these modifications or replacements do not make the essence of corresponding technical solutions depart from the spirit and scope of the technical solutions in the embodiments of the present invention.

What is claimed is:
1. A data shunting method comprising:
   acquiring, by a data transmission device, a total size or a quantity of to-be-transmitted data packets which are cached in a buffer of a shunting node device, including
   a) receiving shunted data packet report information transmitted by a user equipment, wherein the shunted data packet report information comprises (i) a shunting node identifier, and (ii) an identifier list of data packets received by the user equipment from the shunting node device or an identifier of a last data packet received by the user equipment from the shunting node device, and b) acquiring the quantity of the to-be-transmitted data packets cached in the buffer of the shunting node device according to (i) data packet information shunted to the shunting node device, and (ii) the identifier list of the data packets or the identifier of the last data packet; or c) receiving cache status report information transmitted by the shunting node device, and d) acquiring the quantity of the to-be-transmitted data packets cached in the buffer of the shunting node device from the cache status report information;

transmitting, by the data transmission device, a first data packet to the shunting node device when the quantity of the to-be-transmitted data packets is less than a threshold value so that the shunting node device forwards the first data packet to the user equipment; and transmitting, by the data transmission device, a second data packet to the user equipment not via the shunting node device.

2. The data shunting method according to claim 1, wherein before the receiving the shunted data packet report information transmitted by the user equipment, the method further comprises:

transmitting a report instruction message to the user equipment, wherein the report instruction message instructs the user equipment to transmit the shunted data packet report information according to a preset cycle.

3. The data shunting method according to claim 1, wherein the shunted data packet report information further comprises a history data rate of receiving data packets by the user equipment from the shunting node device.

4. The data shunting method according to claim 1, wherein before the receiving the cache status report information transmitted by the shunting node device the method further comprises:

transmitting a report instruction message to the shunting node device, wherein the report instruction message instructs the shunting node device to transmit the cache status report information according to a preset cycle.

5. The data shunting method according to claim 4, wherein, the cache status report information further comprises one or some of following information elements: a history data rate of transmitting data packets by the shunting node device, the quantity of the to-be-transmitted data packets which are cached in the buffer of the shunting node device for a single user equipment, and a history data rate of transmitting data packets by the shunting node device for the single user equipment.

6. The data shunting method according to claim 1, further comprising:

when the quantity of the to-be-transmitted data packets is greater than or equal to the threshold value, terminating transmitting the first data packet to the shunting node device.

7. The data shunting method according to claim 1, wherein before the receiving the shunted data packet report information transmitted by the user equipment, the method further comprises:

transmitting a report instruction message to the user equipment, wherein the report instruction message instructs the user equipment to transmit the shunted data packet report information every time when receiving a preset quantity or size of data packets.

8. The data shunting method according to claim 1, wherein before the receiving the cache status report information transmitted by the shunting node device the method further comprises:

transmitting a report instruction message to the shunting node device, wherein the report instruction message instructs the shunting node device to transmit the cache status report information every time when transmitting a preset quantity of data packets.

9. A data transmission device comprising computing hardware and a non-transitory computer-readable memory including computer-executable instructions executed by the computing hardware to perform, on the device, operations comprising:

acquiring a quantity of to-be-transmitted data packets which are cached in a buffer of a shunting node device, including a) receiving shunted data packet report information transmitted by a user equipment, wherein the shunted data packet report information comprises (i) a shunting node identifier, and (ii) an identifier list of data packets received by the user equipment from the shunting node device or an identifier of a last data packet received by the user equipment from the shunting node device; and b) acquiring the quantity of the to-be-transmitted data packets cached in the buffer of the shunting node device according to (i) data packet information shunted to the shunting node device, and (ii) the identifier list of the data packets or the identifier of the last data packet received by the user equipment from the shunting node device; or c.) receiving cache status report information transmitted by the shunting node device, and d.) acquiring the quantity of the to-be-transmitted data packets cached in the buffer of the shunting node device from the cache status report information; and transmitting first data packet to the shunting node device when the quantity of the to-be-transmitted data packets is less than a threshold value so that the shunting node device forwards the first data packet to the user equipment, and transmitting, by the data transmission device, second data packet to the user equipment not via the shunting node device.

10. The data transmission device according to claim 9, wherein the operations further comprise:

transmitting a report instruction message to the user equipment, wherein the report instruction message instructs the user equipment to transmit the shunted data packet report information according to a preset cycle.

11. The data transmission device according to claim 9, wherein the operations further comprise:

transmitting a second report instruction message to the shunting node device, wherein the second report instruction message instructs the shunting node device to transmit the cache status report information according to a preset cycle.

12. The data transmission device according to claim 9, wherein the operations further comprise, when the quantity of the to-be-transmitted data packets is greater than or equal to the threshold value, terminating transmitting the first data packet to the shunting node device.

13. The data transmission device according to claim 9, wherein the operations further comprise:

transmitting a report instruction message to the user equipment, wherein the report instruction message instructs the user equipment to transmit the shunted data packet report information every time when receiving a preset quantity of data packets.

14. The data transmission device according to claim 9, wherein the operations further comprise:
transmitting a report instruction message to the shunting node device, wherein the report instruction message instructs the shunting node device transmit the cache status report information every time when transmitting a preset quantity of data packets.

15. A data shunting method comprising:
receiving, by a shunting node device, a report instruction message transmitted by a data transmission device, wherein the report instruction message instructs a user equipment to transmit shunted data packet report information according to a preset period, or instructs the user equipment to transmit shunted data packet report information every time when receiving a preset quantity of data packets; and transmitting, by the shunting node device, the shunted data packet report information to the data transmission device according to the preset period, or transmitting the shunted data packet report information to the data transmission device every time when receiving the preset quantity of data packets,
wherein the shunted data packet report information comprises a shunting node identifier, and an identifier list of data packets received by the user equipment from the shunting node device or an identifier of a last data packet received by the user equipment from the shunting node device.

16. The data shunting method according to claim 15, wherein the shunted data packet report information further comprises a history data rate of receiving shunted data packets by the user equipment from the shunting node device.

* * * * *